US006972693B2

(12) United States Patent
Brown et al.

(10) Patent No.: US 6,972,693 B2
(45) Date of Patent: Dec. 6, 2005

(54) VEHICLE SECURITY INSPECTION SYSTEM

(76) Inventors: Betty J. Brown, 11316 Narrow Trail Ter., Beltsville, MD (US) 20705; Annie D. Minter, 303 Madison, Stuttgart, AR (US) 72160

( * ) Notice: Subject to any disclaimer, the term of this patent is extended or adjusted under 35 U.S.C. 154(b) by 17 days.

(21) Appl. No.: 10/831,109

(22) Filed: Apr. 26, 2004

(65) Prior Publication Data

US 2004/0232054 A1    Nov. 25, 2004

Related U.S. Application Data

(60) Provisional application No. 60/471,329, filed on May 19, 2003.

(51) Int. Cl.[7] .............................................. G08G 1/095
(52) U.S. Cl. ..................... 340/907; 250/358.1; 378/57; 702/188
(58) Field of Search ....................... 340/907; 702/188; 378/57; 250/358.1

(56) References Cited

U.S. PATENT DOCUMENTS

| | | | |
|---|---|---|---|
| 5,022,062 A | 6/1991 | Annis | |
| 5,694,867 A | 12/1997 | Diaz-Lopez | |
| 5,903,623 A * | 5/1999 | Swift et al. | .................... 378/57 |
| 5,992,094 A | 11/1999 | Diaz | |
| 6,298,603 B1 | 10/2001 | Diaz | |
| 6,308,644 B1 | 10/2001 | Diaz | |
| 6,359,582 B1 | 3/2002 | MacAleese et al. | |
| 6,469,624 B1 | 10/2002 | Whan | |
| 6,542,580 B1 * | 4/2003 | Carver et al. | .................. 378/57 |
| 2003/0085348 A1 * | 5/2003 | Megerle | ..................... 250/287 |
| 2004/0017888 A1 * | 1/2004 | Seppi et al. | ................... 378/57 |
| 2004/0179647 A1 * | 9/2004 | Zhao et al. | .................... 378/57 |

FOREIGN PATENT DOCUMENTS

GB            2049030         12/1980

OTHER PUBLICATIONS

WEBSITE, www.totalsecurity.us, Accessed on Mar. 26, 2003, Vehicle Screening System.
WEBSITE, http://tracedetection.com, Accessed on Mar. 26, 2003, "LVBDS," Large Vehicle Bomb Detection System.

* cited by examiner

Primary Examiner—Daniel Wu
Assistant Examiner—Samuel J. Walk
(74) Attorney, Agent, or Firm—Richard C. Litman

(57) ABSTRACT

The vehicle security inspection system may include multiple automated detection devices for detecting explosives, weapons, contraband, etc. which may be contained on or within a motor vehicle. The system includes a tunnel or enclosure with a moving conveyor therein. A motor vehicle is driven into the entrance to the enclosure, and conveyed past the series of sensors by the conveyor belt. One or more surveillance cameras may be installed in the enclosure, as well. The various sensors incorporated therein check the vehicle for illegal articles, and the vehicle is released from the enclosure. A control gate may be provided as a door at the exit of the enclosure, and/or as a gate guiding vehicles along their intended route or to a detention area, as appropriate. The system may be provided either as a portable device or as a permanent installation, and/or may be configured as a multiple lane inspection system.

20 Claims, 5 Drawing Sheets

VEHICLE SECURITY INSPECTION SYSTEM

CROSS-REFERENCE TO RELATED APPLICATION

This application claims the benefit of U.S. Provisional Patent Application Ser. No. 60/471,329, filed May 19, 2003.

BACKGROUND OF THE INVENTION

1. Field of the Invention

The present invention relates generally to devices and systems for the detection of weapons, explosives, and contraband, and more specifically to a portable or permanently installed system for rapidly inspecting motor vehicles. The present system includes one or more tunnels or enclosures through which motor vehicles are transported on a moving belt or the like. Each of the enclosures includes multiple sensor means therein, for detecting various types of dangerous and/or illegal substances which may be concealed in the vehicle. An automated or remotely actuated door or gate is used to route traffic appropriately after passing through the inspection tunnel or enclosure.

2. Description of the Related Art

The expansion of terrorism throughout the world has resulted in increased hazards to many cultures, particularly relatively free and open societies such as the United States of America. In such an open society, it is relatively easy to do a great deal of damage, as evidenced by "car bombs," i.e., automobiles or other vehicles loaded with explosives and detonated beneath or near a building structure.

Such motor vehicles are also used for concealing and smuggling various types of weaponry and contraband (drugs, etc.). Authorities are well aware of the potential hazards of such concealed articles and materials, and a number of automated inspection devices employing different principles of operation have been developed in response. Nevertheless, the inspection of every vehicle passing a given point or location is generally impractical in most instances. This is particularly true for large scale events, e.g. major sporting events, public events at military bases, facilities providing daily employment to large numbers of workers and staff, etc. Presently, inspection devices employing one principle of operation are utilized for detecting explosives, and another principle or principles is/are used for the detection of concealed weapons. These various detection devices are independent of one another and must be used separately in any given inspection station or location. In many instances, authorities simply cannot provide the number of personnel required to perform all of the inspections necessary to completely inspect all vehicles passing through a given checkpoint. Even if it were possible to provide sufficient personnel, this would clearly add considerably to the time involved in a detailed inspection of every vehicle passing through a given inspection point.

The present invention provides a solution to this problem by providing a tunnel or enclosure through which all vehicles are routed for inspection. The tunnel or enclosure may include inspection devices utilizing various principles of operation, thus providing inspection of the vehicle for explosives, concealed weaponry, and/or other contraband (e.g. drugs, etc.) in a single inspection stop. The present inspection system is completely automated, with a release door or gate retaining vehicles until the inspection has been successfully completed. Further automated or remotely actuated gates control vehicle movement as desired, either to continue their trip or to be routed to a holding or detention area if illicit materials have been detected. The present vehicle security inspection system may comprise multiple lanes for the rapid inspection of a large number of vehicles entering or departing a given location, and the individual units or modules may be constructed to be portable for transport to various locations for temporary use, e.g. a major sporting event, etc.

A discussion of the related art of which the client is aware, and its differences and distinctions from the present invention, is provided below.

U.S. Pat. No. 5,022,062 issued on Jun. 4, 1991 to Martin Annis, titled "Automatic Threat Detection Based On Illumination By Penetrating Radiant Energy Using Histogram Processing," describes the use of X-ray technology to produce a map or histogram of an object. Comparison is made to other histograms or maps of known objects, to determine the type of object being scanned. While the use of X-ray technology may be essential for scanning dense metallic objects, this technology is not desired as a part of a preferred embodiment of the present invention, in which passengers remain within the vehicle during the inspection operation. In any event, Annis does not disclose any form of enclosure or tunnel for containing a vehicle during inspection, nor does he disclose any means for moving or carrying the vehicle through such a tunnel or controlling vehicle movement after leaving the tunnel, as provided by the present invention.

U.S. Pat. No. 5,694,867 issued on Dec. 9, 1997 to William Diaz-Lopez, titled "Fail-Safe Access Control Chamber Security System," describes a security vestibule comprising a series of interconnected, but mutually exclusive, small rooms or booths. Each has a weapons detector comprising a magnetic sensing system installed in a floor mat within the chamber. The Diaz-Lopez chamber system is intended for checking individual persons, as at a bank entrance or the like, and cannot be used to check or inspect a motor vehicle, whether the vehicle contains passengers or not. Diaz-Lopez expects persons using the system to travel through the chambers of the device under their own power; no automated movement is provided for persons passing through the device.

U.S. Pat. No. 5,992,094 issued on Nov. 30, 1999 to William Diaz, titled "Access Control Vestibule," describes a device closely related to that of the '867 U.S. Patent to the same inventor, discussed immediately above. The same points of difference between the present invention and the device of the '867 U.S. Patent noted above, are seen to apply here as well.

U.S. Pat. No. 6,298,603 issued on Oct. 9, 2001 to William Diaz, titled "Access Control Vestibule," is a continuation of the '094 U.S. Patent discussed immediately above. The same points noted in the discussion of the '867 U.S. Patent, upon which the '094 U.S. Patent is based, are seen to apply here as well.

U.S. Pat. No. 6,308,644 issued on Oct. 30, 2001 to William Diaz, titled "Fail-Safe Access Control Chamber Security System," is a once-removed continuation of the '867 U.S. Patent discussed further above. The same points noted in the discussion of the '867 U.S. Patent are seen to apply here as well.

U.S. Pat. No. 6,359,582 issued on Mar. 19, 2002 to Gregory B. MacAleese et al., titled "Concealed Weapons Detection System," describes a hand-held metal detector using an active transmission principle to detect metallic objects concealed on a person at several yards distance. The MacAleese et al. device transmits a series of electromagnetic pulses (radar), which are reflected back to the transceiver and processed to determine whether or not the subject is carrying any significant metallic objects (weapons, etc.). It does not appear that the MacAleese et al. device is operable through the metal structure of a motor vehicle or the like, to find weapons concealed therein. In any event, no tunnel or enclosure, automated vehicle transport means through the tunnel, or automated or remotely controlled exit gate or path are provided by MacAleese et al.

U.S. Pat. No. 6,469,624 issued on Oct. 22, 2002 to Wen J. Whan et al., titled "Non-Obtrusive Weapon Detection System," describes a device similar to that of the MacAleese et al. U.S. Patent discussed immediately above. The same points of difference noted between the MacAleese et al. device, and the present invention, are seen to apply here as well.

British Patent Publication No. 2,049,030 published on Dec. 17, 1980, titled "Security Devices," describes a security vestibule similar to those of the various patents to Diaz, described further above. The '030 publication provides either a sliding or revolving door and a metal detector, with the system including means for locking the door if a significant metallic object is detected. As in the case of the Diaz vestibules, the '030 device cannot be used to detect such objects within a motor vehicle, and cannot be used to inspect a motor vehicle therein.

A web page published at www.totalsecurity.us, at least as of Mar. 26, 2003, provides a video clip demonstrating a vehicle screening system. The system includes a large, rigid platform which includes various sensor elements therein. A vehicle is driven atop the platform and stopped for the duration of the automated inspection procedure. The device is apparently capable of detecting both explosives and large metal masses, but no enclosure, automated transport of the vehicle, or gates or doors for restraining vehicles which fail the inspection are disclosed in the Total Security website video clip.

Finally, a web page published by Scintrex Trace Corporation at tracedetection.com, at least as of Mar. 26, 2003, shows sensors for detecting explosives. The Scintrex Trace Corp. produces the "LVBDS," or Large Vehicle Bomb Detection System. While the text describing the device notes features such as tracks, a vehicle guide rail set, and treadle, the device appears to be more closely related to a large scale version of an airline passenger security gate, than it is to the present invention. No tunnel or enclosure, automated or remotely actuated control gate, or selectively actuated gates or doors to control vehicle movement depending upon the passing or failing of the inspection, are apparent in the Scintrex Trace Corp. information.

None of the above inventions and patents, taken either singly or in combination, is seen to describe the instant invention as claimed. Thus a vehicle security inspection system solving the aforementioned problems is desired.

SUMMARY OF THE INVENTION

A vehicle security inspection system provides a means of quickly and easily inspecting motor vehicles which may be carrying unauthorized explosives or other illicit or contraband materials. The present system comprises one or more vehicle enclosures or tunnels, through which motor vehicles are routed for inspection. One or more sensors using one or more detection principles may be installed within the enclosure, e.g., chemical sensors for detecting explosives, electromagnetic resonance devices for detecting metallic objects, etc. One or more surveillance cameras may also be installed within the enclosure, as required. An automated conveyor carries or transports the vehicle from one end of the tunnel or enclosure, to the opposite end, passing all of the various scanners or detectors along the way.

The system preferably includes automated, or remotely actuated, doors, gates, or other retaining means, to hold a vehicle until the inspection has been completed and it has been confirmed that the vehicle has passed the inspection. Different exit routes or roadways may be provided for exiting the device, with a normal route permitting vehicles passing the inspection to continue along their planned route, and an alternative path forcing vehicles failing the inspection to travel to a holding area for further investigation. The control gates or doors may be supplemented by lighting, directional signals, etc. to instruct drivers as to which path they are to take. The present vehicle security inspection system may be constructed as a permanent installation of one or more lanes, e.g. at the entrance to a military base or the like, or may be configured for repeated assembly and disassembly for portable operation, e.g. at the entrance(s) to the parking area(s) for a major sporting event or the like.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a series of embodiments of a vehicle security inspection system, for the automated inspection of motor vehicles for various types of contraband. The term "contraband" used throughout the present disclosure, includes such substances and articles as explosives, firearms, drugs, and/or other illegal an d/or hazardous materials. The present invention is thus useful for vehicle inspections for the prevention of terrorism, transport of illegal weapons and/or drugs, etc., and serves to make more efficient the searches performed for such materials in vehicles at various locations, e.g. border crossings, entrances to military bases, parking lot entrances to large sporting events, etc.

Figure 1:
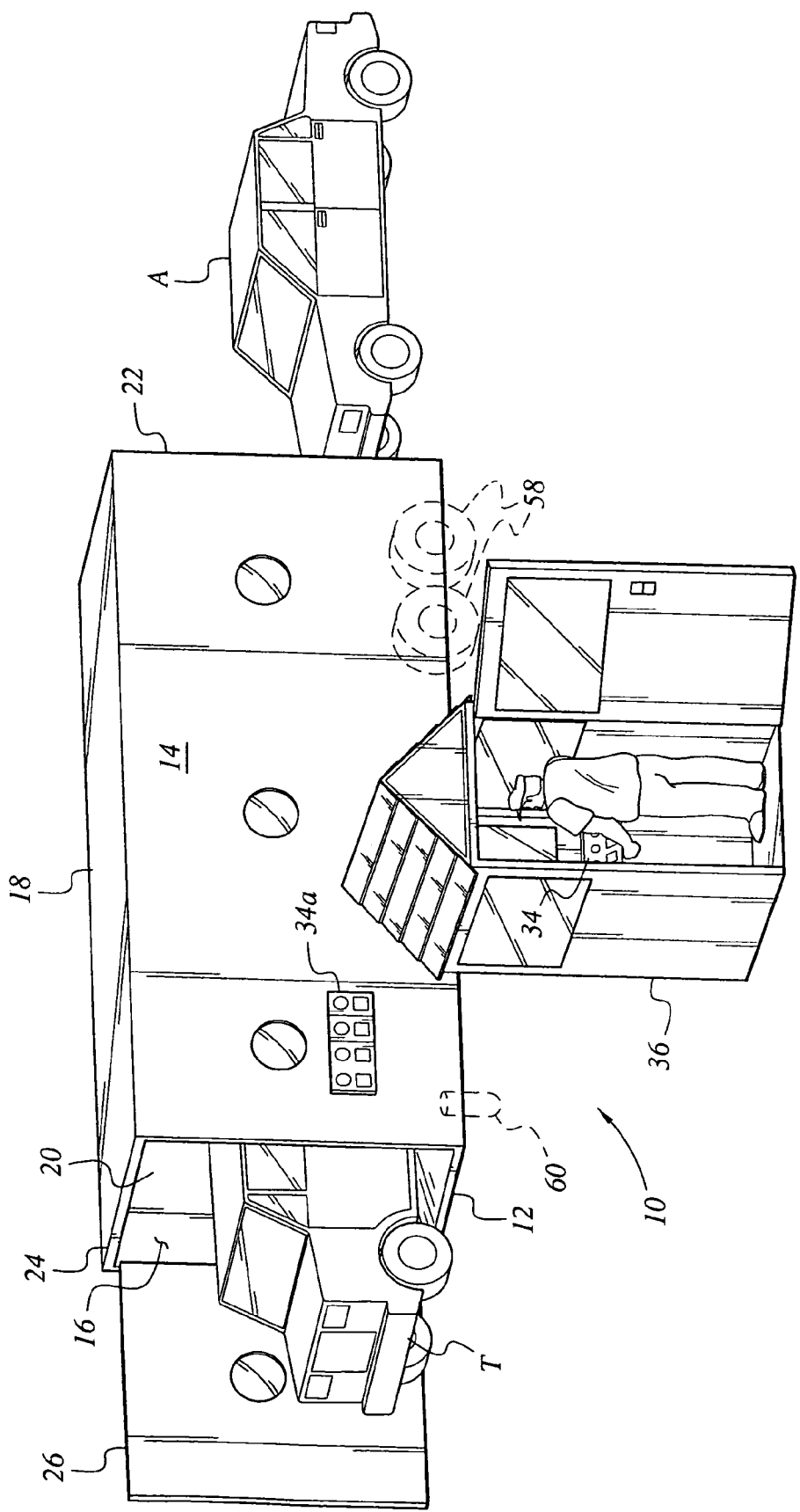
FIG. 1 is an environmental, perspective view of a first embodiment of a vehicle security inspection system according to the present invention, illustrating various features thereof.
Figure 2:
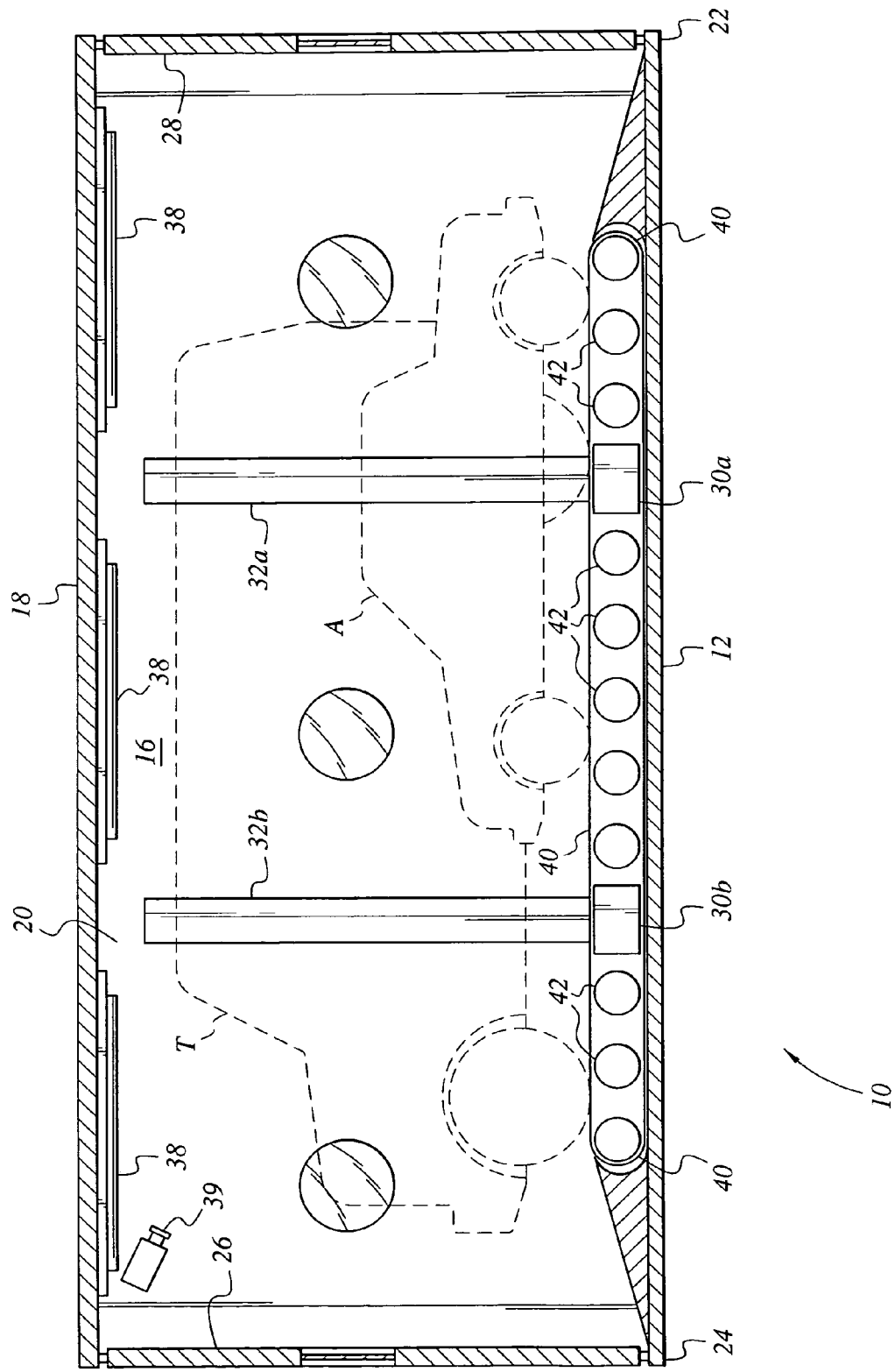
FIG. 2 is a left side elevation view in section of the inspection enclosure of FIG. 1, showing various details thereof.

The present-inspection system essentially comprises a motor vehicle inspection enclosure or tunnel, a first embodiment of which is illustrated in FIG. 1 and designated as enclosure 10. The enclosure 10 includes at least a floor 12 (more details of which are illustrated in FIG. 2), opposed first and second lateral walls 14 and 16, and a roof 18, defining an interior volume 20. The enclosure 10 is configured for the entrance of motor vehicles, e.g. the automobile A or truck T shown in FIG. 1, into the entrance end 22 of the structure, with vehicles departing the exit end 24 after inspection. The present vehicle security inspection enclosure or tunnel 10 may be open at each of the ends 22 and 24, but is preferably provided with at least an exit end gate or door 26. A motor vehicle which does not pass inspection is thus barred from advancing from the exit end 24 of the enclosure or tunnel 10. An entrance doorway or gate 28 may be provided across the entry end 22 of the enclosure 10 to preclude a vehicle from backing out of the enclosure 10, if so desired. While the cross-sectional shape of the tunnel or enclosure 10 is shown as square or rectangular in the drawings, it will be noted that the shape is not critical, and that other cross-sectional shapes may be provided as desired. A square or rectangular shape provides reasonably small exterior dimensions, while still fitting most automobiles and light trucks, vans, and utility vehicles, with their generally boxy shapes.

FIG. 2 provides a somewhat schematic illustration of the interior of the enclosure or tunnel 10, showing the interior componentry thereof. The enclosure 10 includes at least one automated contraband detector or sensor therein, depending upon the type(s) of material(s) or contraband to be detected. Preferably, a series of such detectors 30a, 30b, etc. is provided in the floor 12 of the enclosure, with another series of detectors 32a, 32b, etc. being provided along the walls 14 and 16. Such detectors or sensors are conventional and well known, and operate using several different principles. For example, sensors used for the detection of explosives, drugs, and/or other non-metallic contraband generally use a chemical sensing process. Such devices are capable of detecting miniscule vapors emanating from concealed masses of such contraband, and may be configured to actuate a remote alarm (e.g., the alarm panel 34 in the guard house or monitoring shed 36 in FIG. 1), close the exit and entry doors or gates 26 and 28, and/or take other automated action according to a predetermined program. Other conventional types of sensors, e.g. electromagnetic imaging, ultrasound, etc., may be provided to detect large and/or inappropriate masses of metal, as in the case of concealed firearms.

It is critical that whatever sensing or detection means is used, that it be non-invasive, i.e. that it will not adversely affect the health of persons remaining within the vehicle undergoing inspection. If such invasive and/or potentially hazardous detection means are used, e.g. high intensity X-rays, then all persons, pets, etc. within the vehicle must exit the vehicle before it passes through the inspection tunnel or enclosure 10. High intensity lighting 38, e.g. fluorescent lighting, or alternatively incandescent or high intensity light emitting diodes, etc., is also preferably installed within the tunnel or enclosure 10, to facilitate visual inspection and scanning of the vehicle and its passengers (assuming they remain within the vehicle), using conventional remotely actuated video cameras or the like.

In addition to the above non-invasive inspection means, one or more conventional surveillance cameras 39 may be installed within the enclosure 10. These cameras 39 may provide motion video images of the occupants of a vehicle within the enclosure 10, or perhaps still images, as desired. Such images may be compared either manually or by computer means to a database of images of suspects or wanted persons. Only a single surveillance camera 39 is shown in FIG. 2, secured to the opposite second wall 16 near the exit end door 26. However, it will be seen that additional such cameras 39 may be installed adjacent each of the two walls 14 and 16, and/or at the midpoint and entrance end of the enclosure 10, as required to provide the video coverage desired.

The vehicles passing through the present enclosure 10 are carried by a conveyor 40, as shown in FIG. 2, in order to control their velocity as desired to enable the proper scan rate(s) for the sensor(s) 30a, 30b and 32a, 32b. The motor vehicle conveyor 40 is operated by a series of rollers 42, including at least one drive roller. In this manner, the rate of travel of the vehicle through the enclosure or tunnel 10 may be controlled as required, to assure that a complete inspection is made of the entire vehicle. Conventional technology may be used to govern the speed of the conveyor 40 as required in accordance with the information received by the scanning and detection system.

Preferably, the enclosure or tunnel 10 has a sufficient interior volume or size to accommodate vehicles up to a reasonably large size, e.g. the light truck or van T illustrated in broken lines in FIG. 2 of the drawings, as well as the automobile A in FIG. 2. It will be noted that it may be necessary to provide greater relative length for the tunnel or enclosure 10 than that shown in the drawings, depending upon the size and length of the motor vehicles to be inspected by the device, the type and number of sensors or detectors employed therein, and perhaps other factors as well. The enclosure or tunnel 10 of FIGS. 1 through 3, as well as other embodiments shown in other drawing Figures, are drawn somewhat schematically, and the actual dimensions and proportions may differ considerably from those indicated in the drawing Figures of the present disclosure. Moreover, provision of a portable embodiment, as discussed further below, may place limits upon the size of the device.

Figure 3:
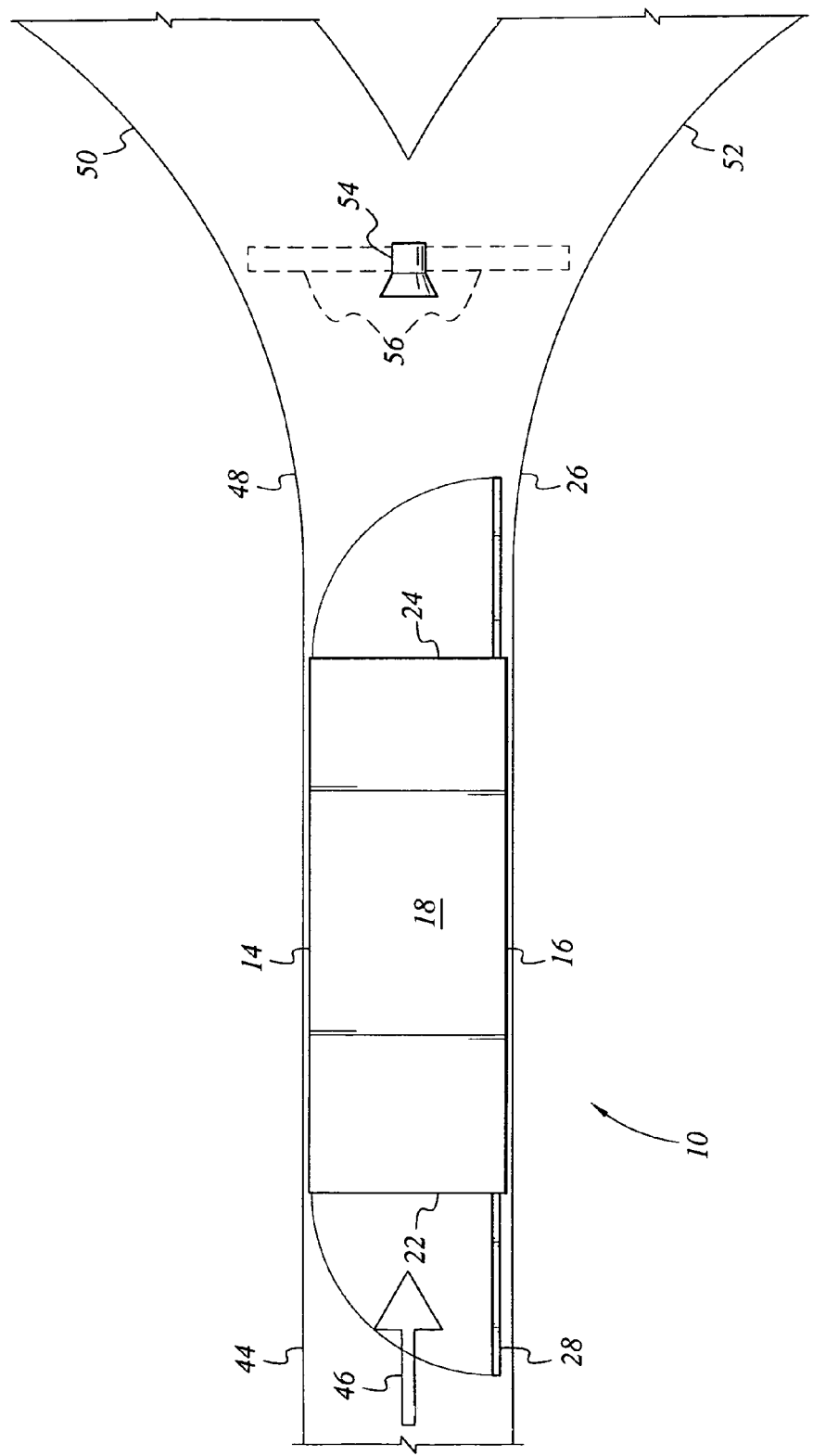
FIG. 3 is a top plan schematic view of the enclosure of FIGS. 1 and 2, showing entrance and exit gates and a route control gate and light system incorporated therewith.

FIG. 3 provides a top plan view of an exemplary installation of the present vehicle inspection system. In FIG. 3, vehicles enter the tunnel or enclosure 10 from an entrance lane 44 to the left, as indicated by the directional arrow 46. The entry door or gate 28 has been opened, to allow the vehicle (not shown in FIG. 3) to enter the enclosure 10. The exit door or gate 26 would normally be closed when the vehicle is entering the enclosure 10, with the entry door or gate 28 closing behind the vehicle after it has entered the enclosure 10.

Two outcomes are possible for the vehicle undergoing inspection within the tunnel or enclosure 10: Either the vehicle will pass the inspection, or it will not. A vehicle failing the inspection may be retained within the tunnel or enclosure 10 by the entry and exit doors or gates 22 and 24, if so desired, with personnel entering the enclosure to perform a more detailed inspection as required. However, this will have the effect of shutting down the inspection line until the vehicle is removed from the enclosure 10.

Accordingly, all vehicles are preferably released from the tunnel or enclosure 10 once the inspection has been completed (either passed or failed), and the vehicle is routed accordingly along the exit lane 48 extending from the exit end 24 of the tunnel 10, to its branch at a continuation lane 50 and detention lane 52. The vehicle will be routed to the appropriate lane 50 or 52, by a signal 54 (e.g. a flashing arrow indicating the appropriate direction of travel, red or green light, etc.).

A selectively operable motor vehicle control gate 56 has an arm extending across either the continuation lane 50 or the detention lane 52, thus opening the opposite lane for vehicle traffic. Both the signal 54 and arm or gate 56 receive signals from the detection apparatus via conventional means (hard cable, RF or IR signals, etc.), and operate accordingly. Normally, the signal 54 will indicate that the exiting vehicle should travel to the continuation lane 50, with the control gate 56 blocking the detention lane 52. However, when contraband is detected, the signal 54 will indicate that travel should proceed to the detention lane 52, with the gate or arm 56 swinging over to block travel to the continuation lane 50 and open the detention lane 52. Additional security personnel and/or other inspection means may be located in the detention area, to perform a more thorough inspection of the vehicle. In this manner, the inspection enclosure 10 is available for the next vehicle in line, regardless of the outcome of the inspection of the previous vehicle.

It has been noted further above, that the present vehicle security inspection system is well suited for use at temporary events, such as major sporting events (e.g., the Olympics, the Super Bowl, World Series, etc.) and at other functions and activities where use of the facility and/or vehicle parking is infrequent. Accordingly, the present system may be configured in a size sufficiently small to allow over the road, or perhaps rail, transport to a desired site for use. For over the road transport, the enclosure or tunnel 10 may be equipped with removable wheels and tires 58, as shown in broken lines in FIG. 1, with a fifth wheel hitch pin 60 also being shown in broken lines. These components 58 and/or 60 may be removed when the enclosure reaches its desired location for temporary use, and may be reinstalled to configure the enclosure 10 as a semi-trailer for transport to a storage area or another location for further use, as desired.

It is anticipated that vehicle inspections using the present system will progress quite rapidly and efficiently, taking perhaps less than a minute per vehicle, depending upon the type of contraband and corresponding sensor(s) or detector (s), the number and sophistication of the detectors installed, the size and configuration of the vehicles, and perhaps other factors. However, this may still result in some delay of traffic, particularly for a major event with thousands of vehicles seeking parking for the event. Parking lots at such events nearly universally provide several lanes for simultaneous entry of several vehicles, in order to speed up traffic flow. Accordingly, the present invention may be provided in a multiple unit configuration, as illustrated in FIG. 4 of the drawings.

Figure 4:
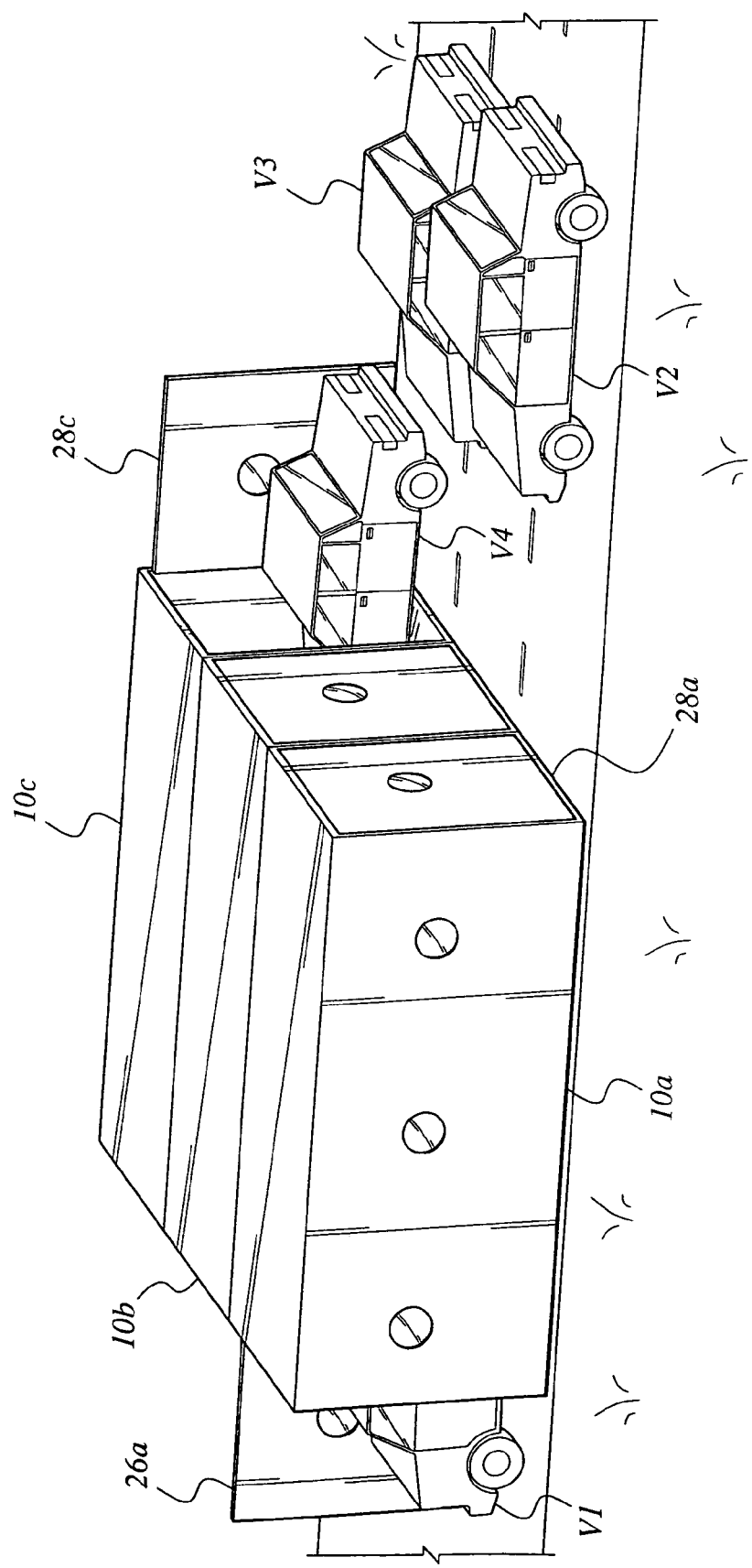
FIG. 4 is a perspective view of an alternate embodiment of an inspection enclosure in a vehicle security inspection system according to the present invention, having a plurality of parallel inspection enclosures across multiple traffic lanes.

In FIG. 4, a series of three enclosures or tunnels, respectively 10a, 10b, and 10c, are assembled adjacent to one another along multiple lanes of traffic. The enclosures or tunnels 10a through 10c may be operated independently of one another, with a first vehicle V1 being shown exiting the open exit door 26a of the first enclosure 10a, and a second vehicle V2 awaiting entrance at the still closed entrance door or gate 28a. A third vehicle V3 is awaiting entry to the second enclosure 10b, where another vehicle (not shown) is undergoing inspection. Finally, a fourth vehicle V4 is shown entering the third enclosure or tunnel 10c via its open entry door 28c, to begin its inspection process. It will be seen that any practicable number of the present tunnels or enclosures may be assembled together or adjacent one another as desired, depending upon the number of lanes or space available, the anticipated peak traffic, and other factors.

Figure 5:
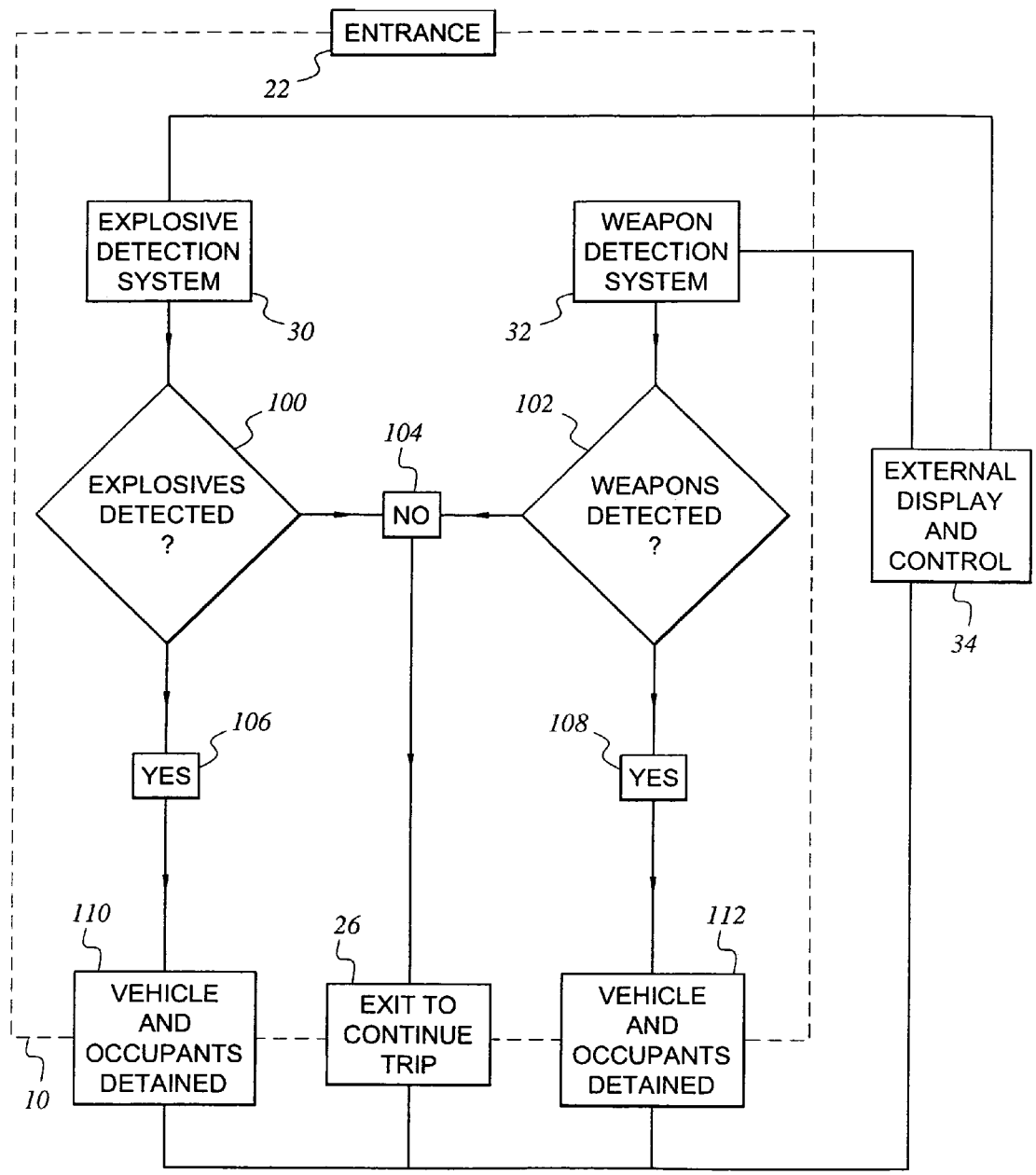
FIG. 5 is a flow chart illustrating the basic steps in the method of operation of the present vehicle security inspection system.

FIG. 5 provides a block diagram and flow chart showing the basic operation of the present vehicle security inspection system invention. Most of the components are contained within the enclosure tunnel 10, which is indicated by a broken rectangular line in FIG. 5. Vehicles enter the enclosure 10 via the entrance end 22, shown at the top of FIG. 5. One or more automated contraband detectors, e.g. the explosive detector 30 and weapon detector 32, shown in the block diagram and flow chart of FIG. 5, may be provided within the enclosure tunnel 10 as desired to perform the required inspection(s). These units 30 and 32 communicate with the external display and control or alarm panel 34, also illustrated in the guard facility 36 of FIG. 2. Alternatively, a supplemental panel (not shown) may be provided on the exterior of the enclosure 10.

A vehicle may enter the enclosure tunnel 10 once the entry gate or door 28 (shown in FIGS. 2 through 4) has been opened by the controlling authority. Vehicles entering the enclosure tunnel 10 are carried through the device by means of the conveyor 40 installed therein, generally as illustrated in FIG. 2. As the sensor or sensors 30 and/or 32, and perhaps other sensors, e.g. drugs, etc., scan the vehicle as it is transported past them by means of the conveyor 40, appropriate signals are transmitted to the appropriate exit doorway, gates, and signals, and also to the external display and control system 34. The system will make a determination as to whether any explosives were detected, as indicated by the first block 100 in FIG. 5, or weapons were detected, as indicated by the second block 102 in FIG. 5. Assuming no contraband is detected, as indicated by the negative block 104 of FIG. 5, the exit system is actuated to open the exit doorway or gate 26 and/or signaling the driver of the vehicle via the signal 54 and adjusting the gate 56 to close the detention lane and open the continuation lane, as shown generally in FIG. 3 of the drawings.

However, if either explosives or weapons are detected during the operations of blocks 100 and 102, as indicated by the respective positive indicators 106 and 108 of FIG. 5, the system fails to send a signal to the exit door 26, and the door remains closed. Alternatively, the door 26 may be opened, with the system sending a signal to activate the control signal 54 and control gate 56 (shown in FIG. 3), instructing the driver of the vehicle to proceed to the detention lane 52. This is indicated generally by the "Vehicle and Occupants Detained" blocks 110 and 112 of FIG. 5, respectively for positives 106 and 108 of the Explosives and Weapons Detected blocks 100 and 102 of FIG. 5.

In conclusion, the present vehicle security inspection system in its various embodiments provides a secure and efficient means of checking and inspecting vehicles entering a given area. The present system is particularly well suited for use at entrances to military installations, parking garages at large building installations, and other similar areas where the detection of explosives and/or weaponry in vehicles is critical.

However, the present system may be easily constructed in a portable configuration, simply by adding conventional removable wheels and tires and a conventional hitch assembly. The device may then be towed as a semi-trailer, or loaded aboard a railroad flat car, etc. for transport to the desired destination. At the destination, the transport wheels and tires may be removed to place the structure on the traffic lane surface for use, and the electrical communications links between the various sensors, annunciator panels, and control gates connected and activated. At the close of the event, the above process is reversed and the device transported to another location for use, or for storage.

The present device may be assembled as a series of multiple units for simultaneously checking vehicles across a number of closely adjacent or separate traffic lanes, if so desired. All that is needed is isolation between the sensors of the various units, in order to preclude interference between sensors of separate units or enclosures. Such a system is capable of processing a large number of vehicles in a given period of time, with minimal delay. The complete enclosure of the present system provides protection from weather for the internal componentry, and the shielding to provide isolation for the various sensors also provides protection from electrical interference due to weather or other causes. The present vehicle inspection system will thus prove to be a most useful and desirable addition to security systems in numerous locations throughout the U.S. and the world.

It is to be understood that the present invention is not limited to the embodiments described above, but encompasses any and all embodiments within the scope of the following claims.

We claim:

1. A method for inspecting a motor vehicle, comprising the steps of:
    (a) providing at least one elongate motor vehicle inspection enclosure having an entrance end and an exit end;
    (b) further providing at least one automated contraband detector therein;
    (c) further providing at least an exit control gate at the exit end of the at least one motor vehicle inspection enclosure;
    (d) further providing a vehicle conveyor within the at least one motor vehicle inspection enclosure;
    (e) further providing a continuation lane for motor vehicles passing inspection;
    (f) further providing a detention lane for motor vehicles failing inspection;
    (g) further providing a selectively operable motor vehicle movement control gate and signal, selectively directing motor vehicles to the continuation lane or the detention lane;
    (h) placing a motor vehicle within the entrance end of the at least one motor vehicle inspection enclosure;
    (i) transporting the motor vehicle through the at least one motor vehicle inspection enclosure on the vehicle conveyor, and past the at least one automated contraband detector;
    (j) detaining the motor vehicle when contraband is detected by the at least one contraband detector; and
    (k) releasing the motor vehicle when no contraband is detected.

2. The method for inspecting a motor vehicle according to claim 1, further including the step of providing a plurality of contraband detectors having at least one explosives detector, at least one weapons detector, and at least one drug detector.

3. The method for inspecting a motor vehicle according to claim 1, further including the steps of:
    (a) providing a selectively controlled entrance control gate at the entrance end of the at least one motor vehicle inspection enclosure; and
    (b) operating the entrance control gate, and controlling motor vehicle traffic entering the at least one motor vehicle inspection enclosure thereby.

4. The method for inspecting a motor vehicle according to claim 1, further including the steps of:
    (a) removably installing transport wheels and tires upon the at least one motor vehicle inspection enclosure;
    (b) transporting the at least one motor vehicle inspection enclosure to a predetermined temporary vehicle inspection site;
    (c) inspecting vehicles at the temporary vehicle inspection site using the at least one motor vehicle inspection enclosure; and
    (d) transporting the at least one motor vehicle inspection enclosure from the temporary vehicle inspection site when vehicle inspections have been completed.

5. The method for inspecting a motor vehicle according to claim 1, further including the steps of:
    (a) providing a plurality of motor vehicle inspection enclosures; and
    (b) simultaneously inspecting a plurality of vehicles using the plurality of motor vehicle inspection enclosures.

6. A vehicle security inspection system, comprising:
    at least one motor vehicle inspection enclosure having an entrance end and an exit end opposite said entrance end;
    at least one automated contraband detector disposed within said at least one motor vehicle inspection enclosure;
    at least one exit control gate communicating with said at least one automated contraband detector;
    an exit lane extending from the exit end of said at least one motor vehicle inspection enclosure;
    a continuation lane extending from the exit lane;
    a detention lane extending from the exit lane;
    a selectively operable motor vehicle movement control gate selectively extending across one of said continuation lane and said detention lane; and
    a signal communicating with said at least one automated contraband detector, selectively directing motor vehicles passing from the exit end of said at least one motor vehicle inspection enclosure to said continuation lane or said detention lane.

7. The vehicle security inspection system according to claim 6, further including a motor vehicle conveyor disposed within said at least one motor vehicle inspection enclosure.

8. The vehicle security inspection system according to claim 6, further including a plurality of contraband detectors selected from the group consisting of at least one explosives detector, at least one weapons detector, and at least one drug detector.

9. The vehicle security inspection system according to claim 6, further including a selectively controlled entrance control gate disposed at the entrance end of said at least one motor vehicle inspection enclosure.

10. The vehicle security inspection system according to claim 6, wherein said at least one motor vehicle inspection enclosure is portable, and further includes a plurality of wheels and tires removably secured thereto.

11. The vehicle security inspection system according to claim 6, wherein said at least one motor vehicle inspection enclosure comprises a plurality of said motor vehicle inspection enclosures adjacently disposed to one another.

12. A vehicle security inspection system, comprising:
    at least one motor vehicle inspection enclosure, having an entrance end and an exit end opposite said entrance end;
    at least one automated contraband detector disposed within said at least one motor vehicle inspection enclosure;
    a motor vehicle conveyor disposed within said at least one motor vehicle inspection enclosure;
    an exit lane extending from said exit end of said at least one motor vehicle inspection enclosure;
    a continuation lane extending from the exit lane;
    a detention lane extending from the exit lane;
    a selectively operable motor vehicle movement control gate selectively extending across one of said continuation lane and said detention lane; and
    a signal communicating with said at least one automated contraband detector, selectively directing motor vehicles passing from the exit end of said at least one motor vehicle inspection enclosure to said continuation lane or said detention lane.

13. The vehicle security inspection system according to claim 12, further including at least one exit control gate communicating with said at least one automated contraband detector.

14. The vehicle security inspection system according to claim 12, further including a plurality of contraband detectors selected from the group consisting of at least one explosives detector, at least one weapons detector, and at least one drug detector.

15. The vehicle security inspection system according to claim 12, further including a selectively controlled entrance control gate disposed at said entrance end of said at least one motor vehicle inspection enclosure.

16. The vehicle security inspection system according to claim 12, wherein said at least one motor vehicle inspection enclosure is portable, and further includes a plurality of wheels and tires removably secured thereto.

17. The vehicle security inspection system according to claim 12, wherein said at least one motor vehicle inspection enclosure comprises a plurality of said motor vehicle inspection enclosures adjacently disposed to one another.

18. The method for inspecting a motor vehicle according to claim 1, further including the steps of:

(a) providing at least one surveillance camera within said at least one motor vehicle inspection enclosure; and (b) comparing images from said at least one surveillance camera to images stored in one or more database.

19. The vehicle security inspection system according to claim 6, further including at least one surveillance camera located within said at least one motor vehicle inspection enclosure;

wherein images from said at least one surveillance camera may be compared to images stored in one or more database.

20. The vehicle security inspection system according to claim 12, further including at least one surveillance camera located within said at least one motor vehicle inspection enclosure;

wherein images from said at least one surveillance camera may be compared to images stored in one or more database.

* * * * *